United States Patent [19]
Henrion

[11] Patent Number: 5,461,615
[45] Date of Patent: Oct. 24, 1995

[54] ASYNCHRONOUS SWITCHING NODE DISTRIBUTING CELLS DYNAMICALLY TO OUTPUTS CONSTITUTING AN IRREGULAR GROUP

[75] Inventor: Michel Henrion, Brussels, Belgium

[73] Assignee: Alcatel N.V., Amsterdam, Netherlands

[21] Appl. No.: 219,712

[22] Filed: Mar. 29, 1994

[30] Foreign Application Priority Data

Mar. 31, 1993 [FR] France ................... 93 03763

[51] Int. Cl.$^6$ .................................... H04L 12/56
[52] U.S. Cl. ............................................... 370/60.1
[58] Field of Search .................... 370/60, 60.1, 94.1, 370/94.2, 110.1

[56] References Cited

U.S. PATENT DOCUMENTS 5,130,984  7/1992  Cisneros ....................... 370/94.1
5,303,078  4/1994  Brackett et al. ................ 370/60.1

FOREIGN PATENT DOCUMENTS

0446540A1  9/1991  European Pat. Off. .
0524350A1  1/1993  European Pat. Off. .

OTHER PUBLICATIONS

Schrodi et al, "Multicast Handling in a Self-Routing Switch Architecture", *Int. Switching Symposium 92*, vol. 2, Oct. 25, 1992, pp. 156–160.
French Search Report FR 9303763.

*Primary Examiner*—Wellington Chin
*Attorney, Agent, or Firm*—Sughrue, Mion, Zinn, Macpeak & Seas

[57] ABSTRACT

The addresses of an irregular group of outputs of an asynchronous switching node distributing cells dynamically to outputs constituting an irregular group cannot be related by any mathematical relationship. To distribute cells applied to inputs of the node as regularly as possible, the node includes translator circuits determining at the network input an internal routing label which identifies a regular subgroup of outputs, each of which may consist of only one output. To this end it uses an algorithm dependent on the rank of the input receiving the cell and the time at which the cell is received. This algorithm therefore achieves spatial decorrelation and temporal decorrelation of the cells. The asynchronous switching node can be used in ATM telecommunication networks, for example.

9 Claims, 7 Drawing Sheets

ASYNCHRONOUS SWITCHING NODE DISTRIBUTING CELLS DYNAMICALLY TO OUTPUTS CONSTITUTING AN IRREGULAR GROUP

BACKGROUND OF THE INVENTION

1. Field of the invention

The invention concerns an asynchronous switching node distributing cells dynamically to outputs constituting an irregular group. A switching node of this kind can be used in an asynchronous telecommunication system including at least two switching nodes connected by a group of at least two transmission links. Each switching node includes an asynchronous switching network having inputs and outputs and made up of a plurality of switching elements disposed in a plurality of stages between the inputs and the outputs.

2. Description of the Prior Art

It is desirable to transfer cells from one node to the other by distributing them regularly to the various transmission links constituting a group, a link being selected cell by cell so that all links receive as close to the same number of cells as possible, in the short term, assuming that the links have the same maximum bit rate.

This prior art method has advantages: improved efficiency of the links between the nodes and improved reliability of communications on the available links in the group. However, it raises the following problem: for each cell the node must be able to identify a group of outputs of the node connected to the group of transmission links to which the cell is addressed; it must then select dynamically one of the outputs thus identified whilst achieving a statistically balanced distribution to the output ports of each group, to which the cell is transferred.

A distinction must be drawn between two situations:
either each group of outputs is regular, i.e. made up of outputs whose addresses are mathematically related;
or some groups are irregular, i.e. made up of outputs whose addresses are not mathematically related.

For example, the addresses of outputs constituting a regular group are in the form: ABXDEFXXIJXX, where A, B, D, E, F, I, J are fixed binary values defining the address of the group and X is a symbol representing either binary value. This address identifies a regular group of 32 outputs with the respective following addresses:

ABODEFOOIJOO
ABODEFOOIJO1
ABODEFOOIJ1O
ABODEFOOIJ11
ABODEFO1IJOO
ABODEFO1IJO1
ABODEFO1IJ1O
ABODEFO1IJ11
ABODEF1OIJOO
ABODEF1OIJO1
ABODEF1OIJ1O
ABODEF1OIJ11
. . . . . . . . . . . .
. . . . . . . . . . .
. . . . . . . . . . .
AB1DEF11IJ11

In the above example, the four possible values of the last pair of bits XX correspond to subgroups each made up of four consecutive outputs and the other three X bits replicate these subgroups of four outputs eight times over, with a regular distribution within the overall set of output addresses.

European patent application n° 91-201915.5 filed 22 Jul. 1991 describes a node capable of distributing cells dynamically to outputs constituting a regular group. The node essentially comprises a switching network which includes a plurality of stages each constituted by at least one switching element. The outputs of the switching network are grouped into a plurality of regular groups, each group comprising at least one output.

The switching network used is of the multipath self-routing type: the path followed by a cell addressed to a given output is not entirely decided when it enters the network, but rather step by step in each stage, with several possible paths across stages other than the first and the last.

Self-routing data internal to the node is associated with each cell by translator means at the node input. The translator means deduce the internal routing data from the external routing data: virtual circuit identity and virtual circuit group identity. If a cell is addressed to a group of outputs, the internal routing data designates all of the destination group of the cell. Thus it does not identify the specific output to be finally selected dynamically by the switching node to transfer the cell in question to the destination group.

The switching network employed is capable of group routing. Each switching element identifies a group of outputs from among its own outputs on the basis of internal self-routing data associated with the cell. The outputs so identified are those providing access to the output (or to the group of outputs) of the network and thus to the output (or to the group of outputs) of the node constituting the destination of the cell. A group of outputs of a switching element providing access to an output (or to a group of outputs) of the node is called a routing group.

The switching element then selects any output from the so identified routing group outputs at random and transfers the cell to this selected output.

The method for identifying the routing group in a switching element is as follows: a cell to be transferred to a given destination includes a destination address in its internal self-routing data. Consider, for example, a cell to be transferred from an input of the node to any output of a group of eight outputs of the node whose addresses are given by the mathematical relationship 1792+k*32 where k=1, 2, 3, . . . , 8 and where "*" is the multiplier sign. The self-routing group address of a cell comprises three bit fields: 11, XXX, 11111. These three bit fields can, for example, correspond to the routing data successively used by the switching elements of a three-stage switching network.

A switching element of the first stage receives the cell and analyzes the first field of the label: the value "11" of the first field identifies one output (or one group of outputs) from four outputs (or from four groups of outputs) of this first stage switching element. The cell is transferred to this output or to one of the outputs of the routing group.

The second switching element analyzes the second field: the value "XXX" of the second field simultaneously identifies all the eight outputs of this switching element. The switching element selects any one of these outputs at random, in such a way as to achieve as regular a statistical distribution as possible, in the short term, as the network has a regular structure in this example. The cell is transferred to the selected output.

The last switching element analyzes the third value: the value "11111" identifies a single one of the 32 outputs of the switching element. This output is connected to an output of the network. All outputs of a second stage switching element are uniformly distributed to the various switching elements of the third stage. Consequently, the distribution effected by the second stage elements distributes successive cells having the same group destination address 11 XXX 11111 to eight outputs of the switching network having addresses related by the expression 1792+k*32. If the distribution is random in the short term the cells are regularly distributed to the eight outputs of the node belonging to the destination regular group.

To implement a switching network of this kind it is possible to use switching elements as described in French patent application FR-A-2 659 819. This switching element is capable of routing cells to groups of outputs (routing groups), statistically balancing the load between the outputs of a group of outputs of the switching element. Selection is effected either by means of a pseudo-random signal generator or on the basis of the respective contents of the outputs queues of the switching element concerned. This known switching element can therefore distribute cells regularly to a regular group of outputs of the node. However, it has the drawback of enabling distribution of cells only when the groups of outputs are regular. The regular groups rule out the use of wild card bit values to identify outputs of a switching element.

An object of the invention is therefore to propose a switching node enabling distribution of cells, cell by cell, to the various links of a group of external links, even when this group is irregular. The solution achieving this object must additionally be compatible with the various conventional methods of routing a cell to a single link. Another object of the invention is to enable distribution of cells in the case of a point-to-multipoint transfer, each destination being an individual link or a group of links.

A trivial solution would be to use the switching network of a node twice in succession for each cell:

a first time to transfer the cell from first inputs to first outputs of the node, a regular group of links connecting the first outputs of a node to a distributor device distributing the cells at random to the links and then returning them to second inputs of the same node; and a second time to transfer the cell from the second inputs to second outputs of the node in order to send the cell on a link of the irregular group of links which constitutes the destination of the cell.

A solution of this kind entails doubling the capacity of the switching network and consequently is not practicable except for a very small network indeed.

SUMMARY OF THE INVENTION

The invention consists in an asynchronous switching node distributing cells dynamically to outputs constituting an irregular group, the addresses of the outputs of an irregular group not being mathematically related, said node including:

an input stage receiving cells on a plurality of inputs and receiving for each cell external routing information, said first stage adding to each cell an internal routing label conditioned by said external routing data; and a plurality of switching stages each including at least one switching element each including means for transferring a cell received at one of its inputs to at least one of its outputs according to said internal routing label associated with said cell;

in which node said input stage includes means for selecting, for each cell addressed to an irregular group of outputs, a routing label from predetermined internal routing labels respectively identifying regular subgroups of outputs, the combination of which constitutes said irregular group, each regular subgroup including a single output or a plurality of outputs whose addresses are mathematically related.

The node of the invention can distribute cells to any group of outputs because any group of outputs can be broken down into a plurality of regular subgroups of outputs. In an extreme case a regular subgroup includes only one output. The distribution problem is solved by combining a new type stage with known type switching stages for routing a cell to a given output or to a given regular group of outputs. The node of the invention can therefore be implemented using known switching elements. Only the first stage of the node, for translating external routing data into an internal routing label, is modified: the label is selected from a set of labels which are predetermined in such a way as to divide the irregular group into regular subgroups compatible with the routing capabilities of the switching stages employed.

According to another feature of the invention the means for selecting a label select it according to an algorithm dependent on the rank of the input receiving said cell.

The node can therefore decorrelate cells having the same destination but incoming to different inputs of the first stage, since the label selected depends on the input.

This method is compatible with conventional routing methods, whether single-path or multipath, as the only step modified is that of converting external routing data into an internal routing label, which happens on the input side of the switching stages.

According to another feature of the invention, to effect dynamic and variable selection of the regular subgroup or of the output within the group, the algorithm whereby an internal routing label is determined is also time-dependent. The node therefore decorrelates temporally the cell that it receives. If one input receives many more cells than the others, the node distributes these cells to the various outputs of the group constituting the common destination of those cells without any of these outputs predominating, by virtue of this temporal decorrelation. Consequently, the node avoids overloading any output of the group relative to the others, as could happen if the algorithm were dependent only on the rank of the input receiving the cell.

In a preferred embodiment of the invention the output selection algorithm is dependent on a variable consisting of the sum of the value of the input rank and a time incremented by units of time equal to the duration of a cell. The resulting value is different for each of the inputs at a given time and is different for successive cells arriving at the same input. This variable therefore enables simultaneous temporal decorrelation and spatial decorrelation.

According to another feature of the invention the selection algorithm is further dependent on the bandwidth of the regular subgroups constituting the group in question. The node therefore avoids overloading subgroups of narrower bandwidth than the others, as it can select more frequently the subgroups having a greater bandwidth.

Various embodiments of the node of the invention are feasible, depending on the routing capabilities of the switching elements. The division of the groups of outputs into regular subgroups is based on these capabilities.

In a first embodiment of the invention the node includes switching stages implementing single-path routing and each of the predetermined internal routing labels identifies a regular subgroup including only one output.

This node is particularly suitable when the switching elements have routing capabilities strictly limited to single-path routing.

In a second embodiment of the invention a node includes at least one switching element implementing single-path routing and further comprises, downstream thereof, an additional stage having the capability to distribute cells at random in a regular group of outputs, called a cluster, each cluster comprising outputs with consecutive addresses; at least one of the predetermined routing labels identifies a regular subgroup made up of a plurality of outputs having consecutive addresses.

This node has the advantage of being particularly well suited to a situation which is very frequently encountered in practise, as the irregular groups of outputs are often made up of clusters of outputs whose addresses are consecutive within each cluster. This relates to the fact that when the capacities of the links between two nodes are increased, links are not added one by one but are generally added by clusters, each cluster being connected to a group of outputs with consecutive addresses.

Further, this embodiment has the advantage of enabling the use of switching elements having routing capabilities restricted to single-path routing, the capabilities of the last stage only being augmented by the capability to distribute to a cluster of outputs.

In a third embodiment of the invention the node includes at least one switching element implementing multipath routing, i.e. including:

means for identifying a group of outputs (routing group) of the outputs of said element providing access via different paths to one of the outputs of a regular subgroup identified by the internal routing label, and means for selecting any output from the identified group of outputs, at least one of a predetermined internal routing labels identifying a regular subgroup including a plurality of outputs.

This network is particularly suitable when the output subgroups are made up of outputs whose addresses are not consecutive but are mathematically related. This situation is relatively frequently encountered in practice, as it applies each time that a group has been duplicated a certain number of times, each time to duplicate its capacity, and the original addresses were not necessarily consecutive.

In a fourth embodiment of the invention, to broadcast a plurality of copies of a cell to a plurality of destinations each of which can be an irregular group, a node includes at least one switching element capable of broadcasting a plurality of copies of a cell to a respective plurality of destinations which are regular groups of outputs according to a predetermined distribution tree, said element including:

means for identifying at least one output from each group of outputs of said element, identified by a distribution tree number in the internal routing label of said cell, and means for outputting a copy of said cell on each of the outputs thus selected, at least one of the predetermined internal routing labels identifying a broadcast tree for routing one copy of a cell to a regular subgroup of each of the irregular groups constituting the destinations of that cell.

This embodiment enables a cell to be broadcast to isolated outputs or to regular groups or to irregular groups by means of known type switching elements having the broadcast capability. Only the first stage of the node is modified, in order to select a subtree from a plurality of predetermined subtrees, each subtree being predetermined to route for each destination one copy of a cell to one of the regular subgroups constituting the irregular group which is that destination.

The invention is further explained and other features of the invention emerge from the following description and the accompanying drawings.

DETAILED DESCRIPTION OF THE INVENTION

Figure 1:
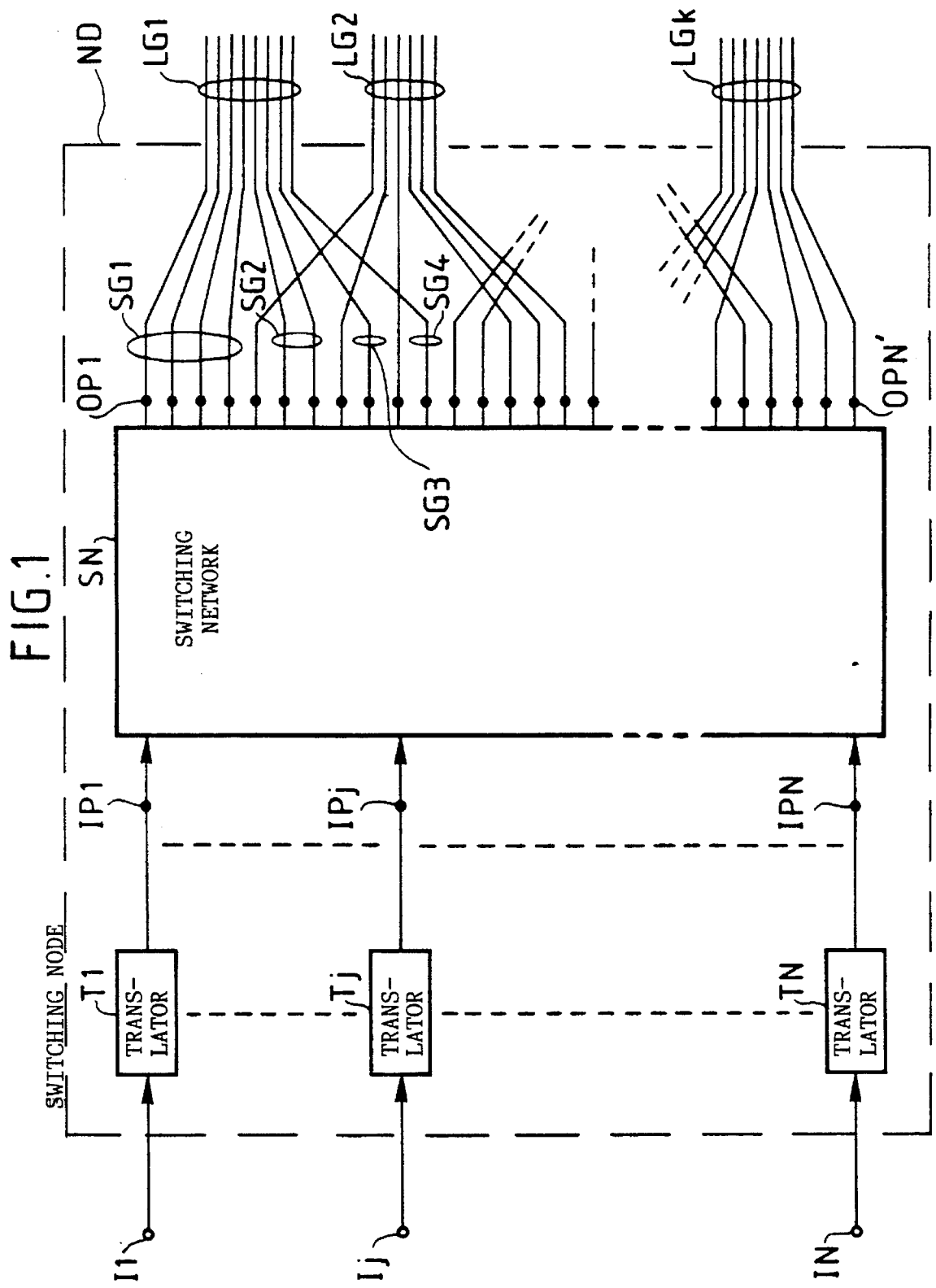
FIG. 1 represents the block diagram of one embodiment of a switching node in accordance with the invention.

The node ND shown in FIG. 1 connect N inputs I1, . . . , Ij, . . . , IN to N' outputs connected to links combined into any groups: LG1, . . . , LGk. Each group can be divided into a number of regular subgroups, a regular subgroup possibly comprising only one output. Consider firstly the situation in which a cell is addressed to a single group of outputs (LG1, for example). This cell is routed in the node ND according to internal routing information contained in an internal routing label which is added to the cell when it enters the node. The internal routing information is deduced from external routing information which can be implicit (rank of the cell in a time-division multiplex) or explicit (virtual circuit or virtual circuit group identifier).

The external routing data designating a call must be converted into an internal routing label by translation, as the fact that the group is irregular prevents determination of this output's address entirely by calculation. This translation can be done, in one step in a first stage of the node, prior to the input of a first stage of switching elements, or in several steps, in the various stages of switching elements, or by a combination of these two methods. According to the present invention, translation is done prior to entry into the first stage of switching elements: a switching node according to the invention includes a first stage which selects, from predetermined labels, a label identifying a regular subgroup of outputs of the node, possibly only one output, using an algorithm dependent on the rank of the input receiving the cell in question and preferably further dependent on the time at which the cell is received.

The embodiment of a node ND represented in FIG. 1 includes:

a switching network SN having N' outputs OP1, ..., OPN' which constitute the outputs of the node ND and N inputs, IP1, ..., IPj, ..., IPN; and N translator circuits T1, ..., TN each having an input and an output and which are interleaved between the inputs I1, ..., IN of the node ND and the inputs IP1, IPN of the switching node network SN.

In the remainder of the description the concept of a group of outputs of the switching network SN and the concept of a group of output links of the node ND are used interchangeably. By virtue of the definition of the group, any cell addressed to one of the groups of links LG1, ..., LGk can be sent to any output OP1, ..., OPN connected to one of the links of this group.

The internal routing labels for each group of outputs are predetermined according to the composition of the group and according to the routing capabilities of the network SN:

single-path routing to a single output, single-path routing to a cluster of outputs having consecutive addresses, or multipath routing a regular subgroup including a plurality of outputs.

FIG. 1 shows by way of example an irregular group LG1 comprising eight outputs which can be divided into four regular subgroups:

subgroup SG1 including four outputs with consecutive addresses, subgroup SG2 including two outputs with consecutive addresses, subgroup SG3 including a single output, and subgroup SG4 including a single output.

This subdivision of the group LG1 is appropriate for a switching network having the capability of routing to a subgroup of outputs having mathematically related addresses or having only the capability for routing to a subgroup of outputs having consecutive addresses. It is not suitable if the network SN has only a single-path routing capability, i.e. the capability to route to a single output. In this case, the group LG1 must be divided into regular subgroups each comprising only one output.

FIGS. 2, 3, 4, 5 and 6 show four examples of distribution of a cell to an output of an irregular group of outputs according to the capability of the switching network SN. The first stage of the node ND, comprising translator devices, is not shown. It provides, for each cell, internal routing data which is different in each of the four cases shown.

In these figures the switching network SN is labelled SN1, SN2, SN3, SN4 to denote the varying capabilities. In the examples shown in FIG. 2, 3, 5, and 6 it includes three stages S1, S2, S3 having a regular topology. Only the example shown in FIG. 4 includes an additional stage S4 enabling random distribution of cells to a cluster of outputs.

Stage S1 is made up of eight input planes PI1 through PI8 each including eight switching elements S11, ..., S18. The stages S2 and S3 are implemented on eight output planes P01, ..., P08 which each carry 16 switching elements, namely eight switching elements S21, ..., S28 for stage S2 and eight switching elements S31, ..., S38 for stage S3. Each switching element has 32 inputs and 32 outputs. The 32 outputs of each switching element of stages S1 and S2 are organized into eight groups OL1, ..., OL8 each of four outputs, each group being connected to a group of four links internal to the switching network.

Likewise, the 32 inputs of each switching element of stages S2 and S3 are organized into eight groups each of four inputs.

Figure 2:
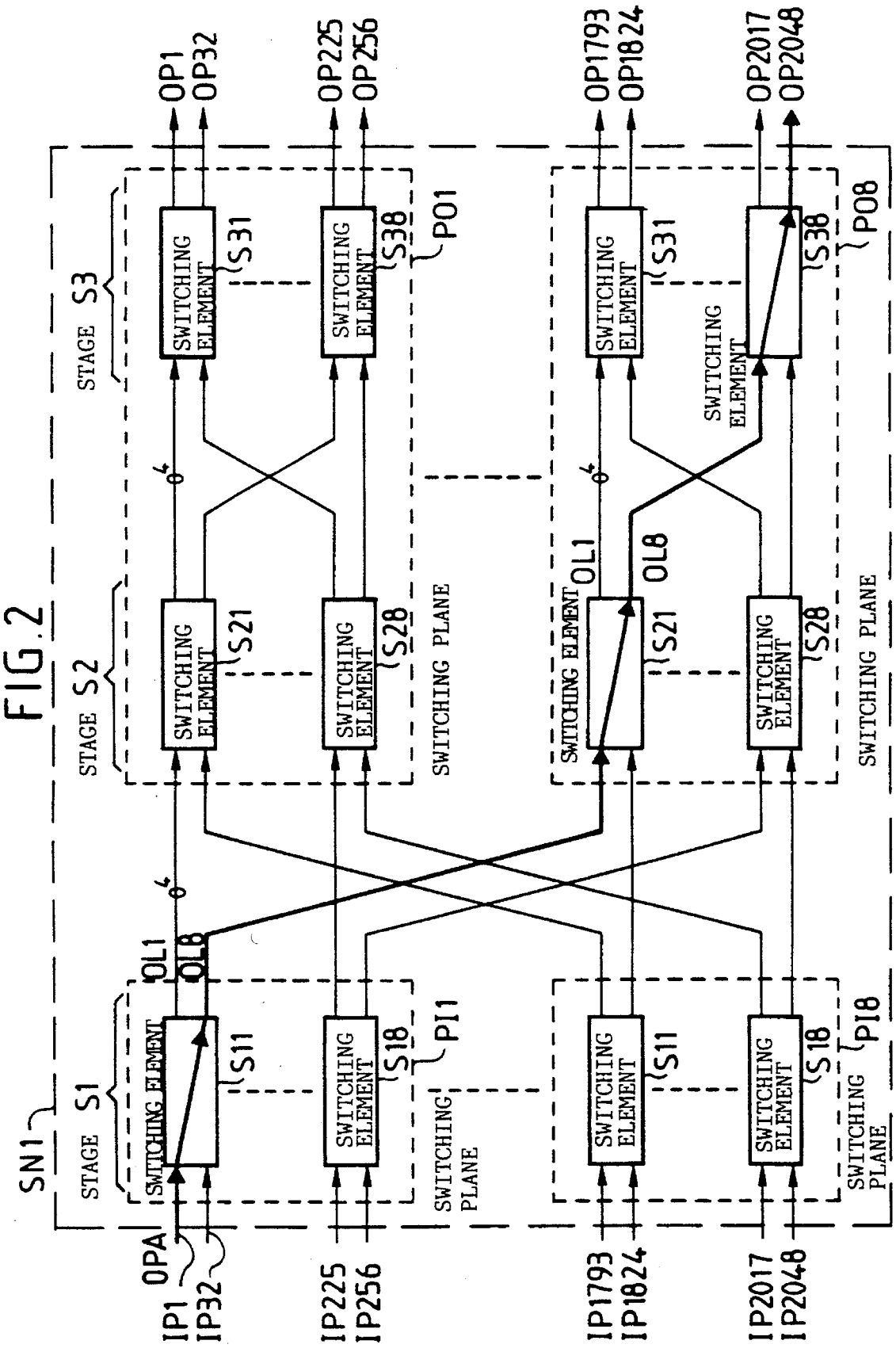
FIG. 2 represents the block diagram of a first embodiment of the switching stages of this embodiment and illustrates their operation when these switching stages have only a single-path routing capability.

In the example shown in FIG. 2, the node includes a switching network S1 with only single-path routing capability. The cell is routed on a path which is entirely determined as soon as an internal routing label is associated with the cell. The destination output is therefore also determined at this time. In this case a regular or irregular group of outputs is divided at the input of the node into subgroups including only one output. The translator device selects a label from the labels respectively constituted by the addresses of the outputs constituting the group.

The internal routing label constituted by an output address OPA then includes a plurality of sets of bits each identifying one output of a switching element through which the cell must pass. Thus for this three-stage switching network SN1 an address OPA of an output of the switching network SN is constituted by three sets of bits.

FIG. 2 shows in bold line the transmission of a cell from the input IP1 of the network SN1 to a single output OP2048 of the network SN1. A first set of three bits of the label identifies one of the eight outputs OL1, ..., OL8 of the switch S11 of the plane PI1 of the first stage. A second set of three bits identifies one of the eight outputs OL1, ..., OL8 of the switching element S21 of the plane P08. A third set including five bits identifies one of the 32 outputs OP2017, ..., OP2048 of the switching element S38 of the plane P08. The output address OPA therefore includes 11 bits in total, enabling routing to any one of the 2048 outputs of the switching network SN1. In this example the address of output OPA is 111, 111, 11111, to route a cell as follows: output OL8 of switching element S11 of stage S1; output OL8 of switching element S21 of stage S2 of plane P08; and, finally, the 32nd output of switch 38 of stage S3 of plane P08; this output constitutes output OP2048 of the network SN1.

Figure 3:
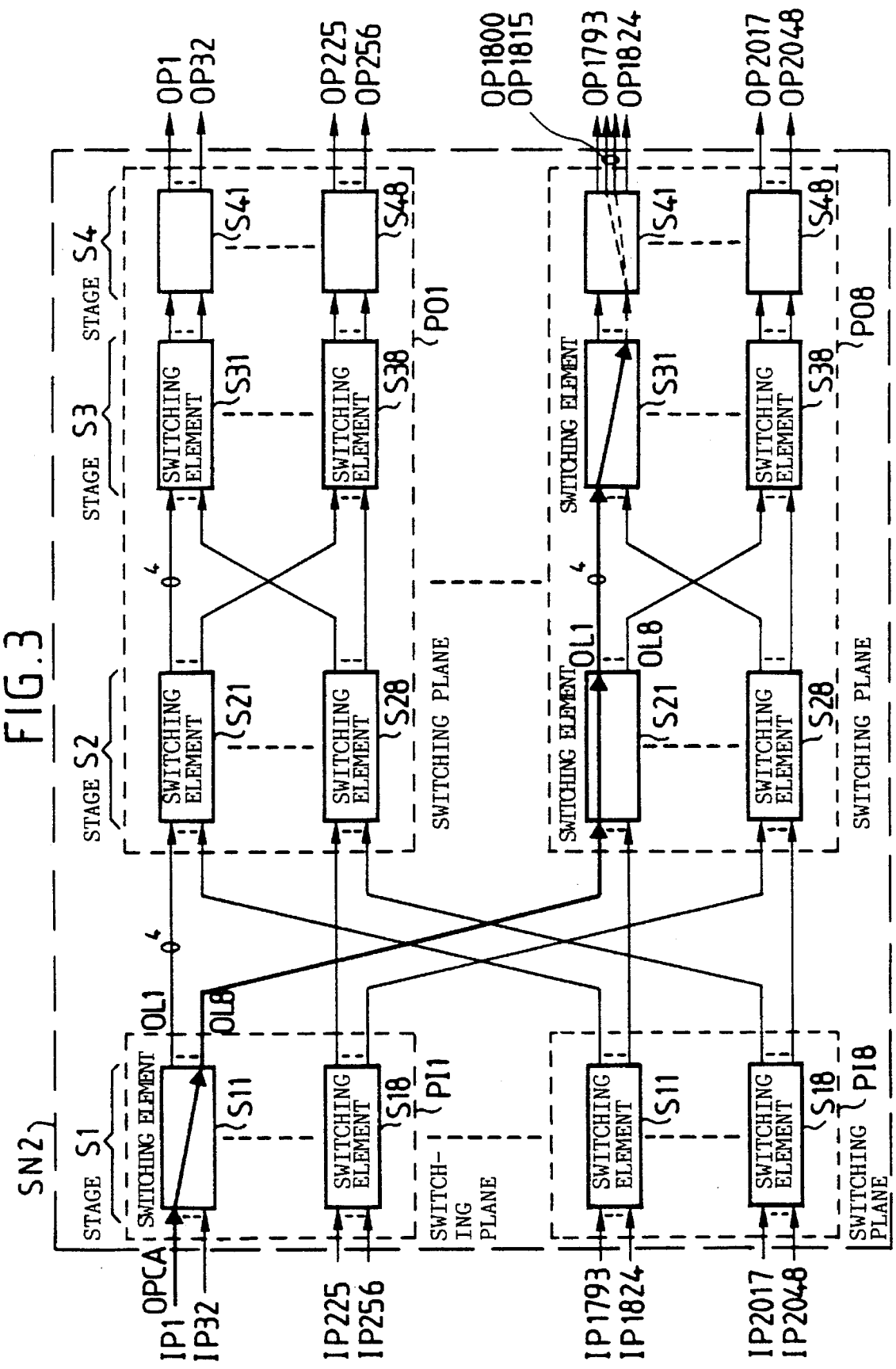
FIG. 3 represents the block diagram of a second embodiment of these switching stages and illustrates their operation for distribution of a cell to an irregular group of outputs made up of a plurality of clusters of outputs having consecutive addresses.

In the example shown in FIG. 3 the node includes a switching network SN2 having the single-path routing capability enhanced by the capability to distribute cells to a cluster of outputs. In this case a group of outputs is divided into regular subgroups which are all clusters in order to benefit from the capabilities of the network SN2. A cluster can include only one output. The translator circuit translates the virtual circuit or virtual circuit group identifier into an output cluster address OPCA.

Compared to the previous embodiment, this embodiment SN2 comprises an additional stage S4 which comprises, in each switching plane P01, ..., P08, known type switching elements S41, ..., S48 for making a random selection within this cluster. In this embodiment the specifications of the switching elements S41, ..., S48 limit the number of outputs per cluster to 32. The switching elements S41, ..., S48 can comprise, for example, a common queue with 32 outputs and an output server which reads the cells waiting in the queue successively and distributes them at random to 32 outputs.

The label OPCA, for example, enables the switches S11, S21, S31 to route a cell along a single path to a single output of the switching element S31 of plane P08. The switching element S48 of the plane P08 then selects at random one of the 16 outputs OP1800, ..., OP1815 constituting the cluster denoted by label OPCA.

Figure 4:
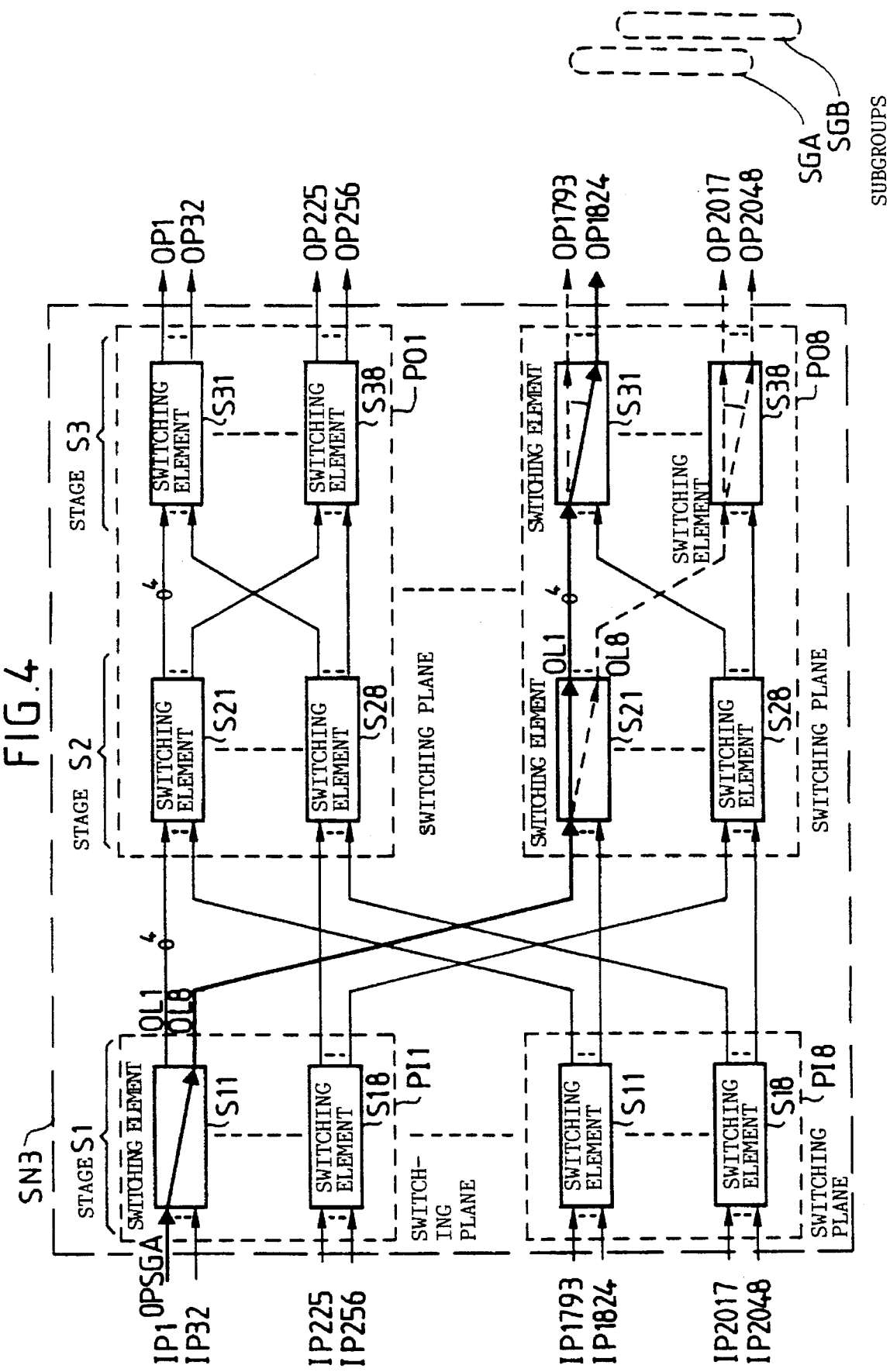
FIG. 4 shows the block diagram of a third embodiment of these switching stages having a multipath routing capability and illustrates their operation for distribution of a cell to an irregular group constituted by a plurality of regular subgroups of outputs having mathematically related non-consecutive addresses.

In the embodiment shown in FIG. 4 the node includes a network SN3 with the capability for multipath routing to a regular output group, not necessarily made up of outputs with consecutive addresses. The same regular group can include a number of outputs up to the total number of outputs (2048) of the node SN3. Each regular group can therefore be divided into a plurality of regular subgroups without limitation as to the number of outputs in each subgroup.

In the embodiment shown the translator circuit translates a virtual circuit and virtual circuit group identifier into a label comprising a regular subgroup address OPSGA selected from two labels as the irregular group can be divided into two regular subgroups SGA and SGB. These subgroups are not clusters because the outputs do not have consecutive addresses.

If the translator circuit has selected subgroup SGB for the cell in question, for example, then the label OPSA designates SGB and enables the switching elements S21 and S31, ..., S38 of plane P08 to select at random one output from all the outputs of the subgroup SGB.

In the regular subgroup SGA, for example, the addresses are of the form 1 761,+K*32 and in the regular subgroup SGB the addresses are of the form 1 792+k*32, where k=1, ..., 8. In the embodiment shown the random selection in the switching elements S21 and S31, ..., S38 of plane P08 transfers the cell to output OP1824 of subgroup SGB. The other paths leading to the unselected outputs of the group are shown in bold dashed line.

The node according to the invention is compatible with the broadcasting of a cell to a plurality of destinations possibly made up of irregular groups of outputs. To enable broadcasting each translator circuit selects an internal self-routing label which comprises the identifier of a broadcast tree enabling one copy of this cell to be routed to a regular subgroup of the irregular group constituting each destination. The situation in which the destination is a single output and the situation in which the destination is a single regular group of outputs are special cases easily deduced from the general case in which the destinations comprise a plurality of irregular groups. To enable broadcasting at least one switching element of the switching network must be capable of broadcasting a cell on the broadcast tree identified by the internal self-routing label. A switching element of this kind identifies at least one output among the outputs of the element on the basis of the broadcast tree identified by the internal routing label associated with the cell and sends a copy of this cell to each of the outputs so identified.

Figure 5:
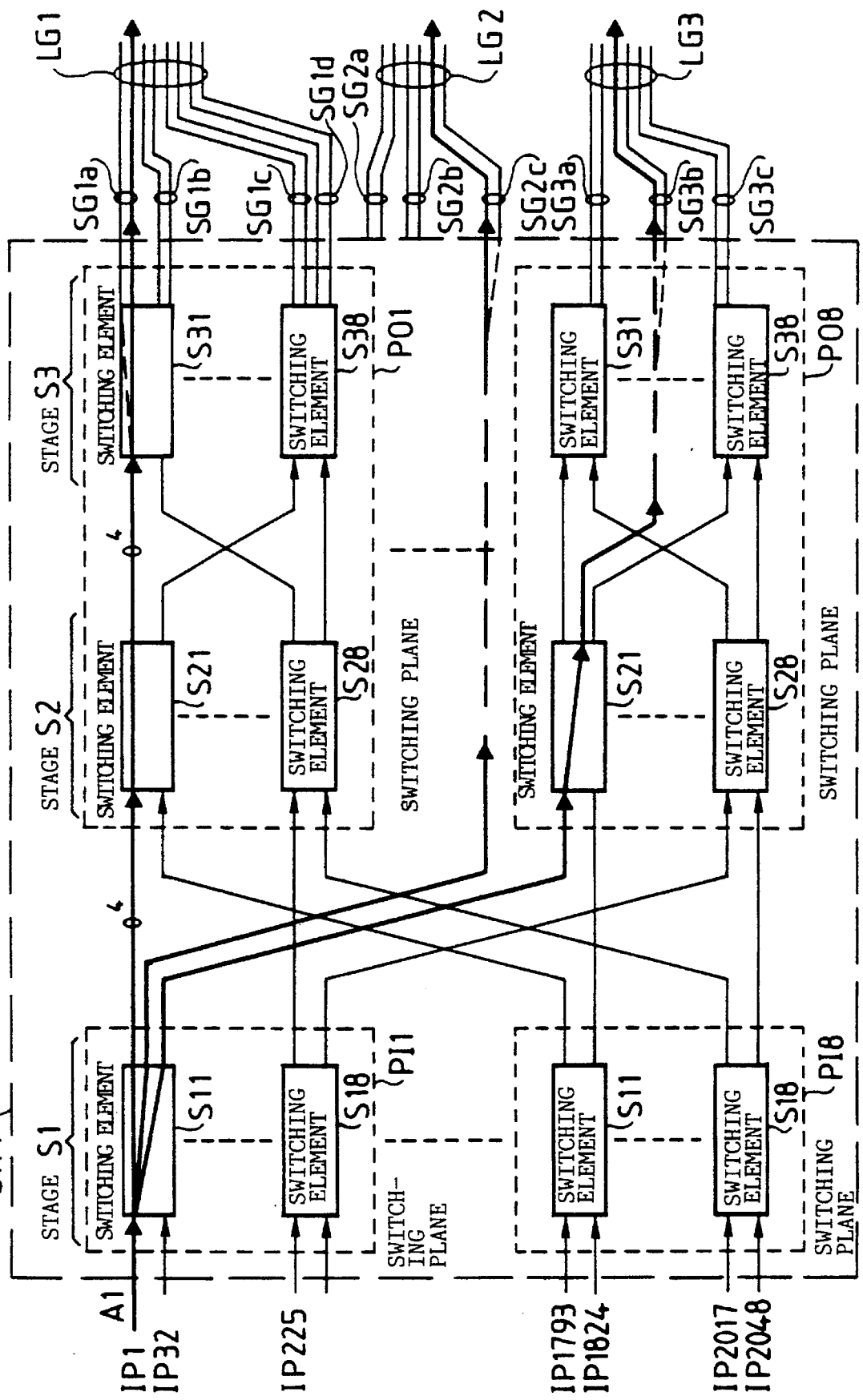
FIGS. 5 and 6 represent the block diagram of a fourth embodiment of these switching stages and illustrate their operation for broadcasting a cell to three destinations comprising three irregular groups of outputs.
Figure 6:
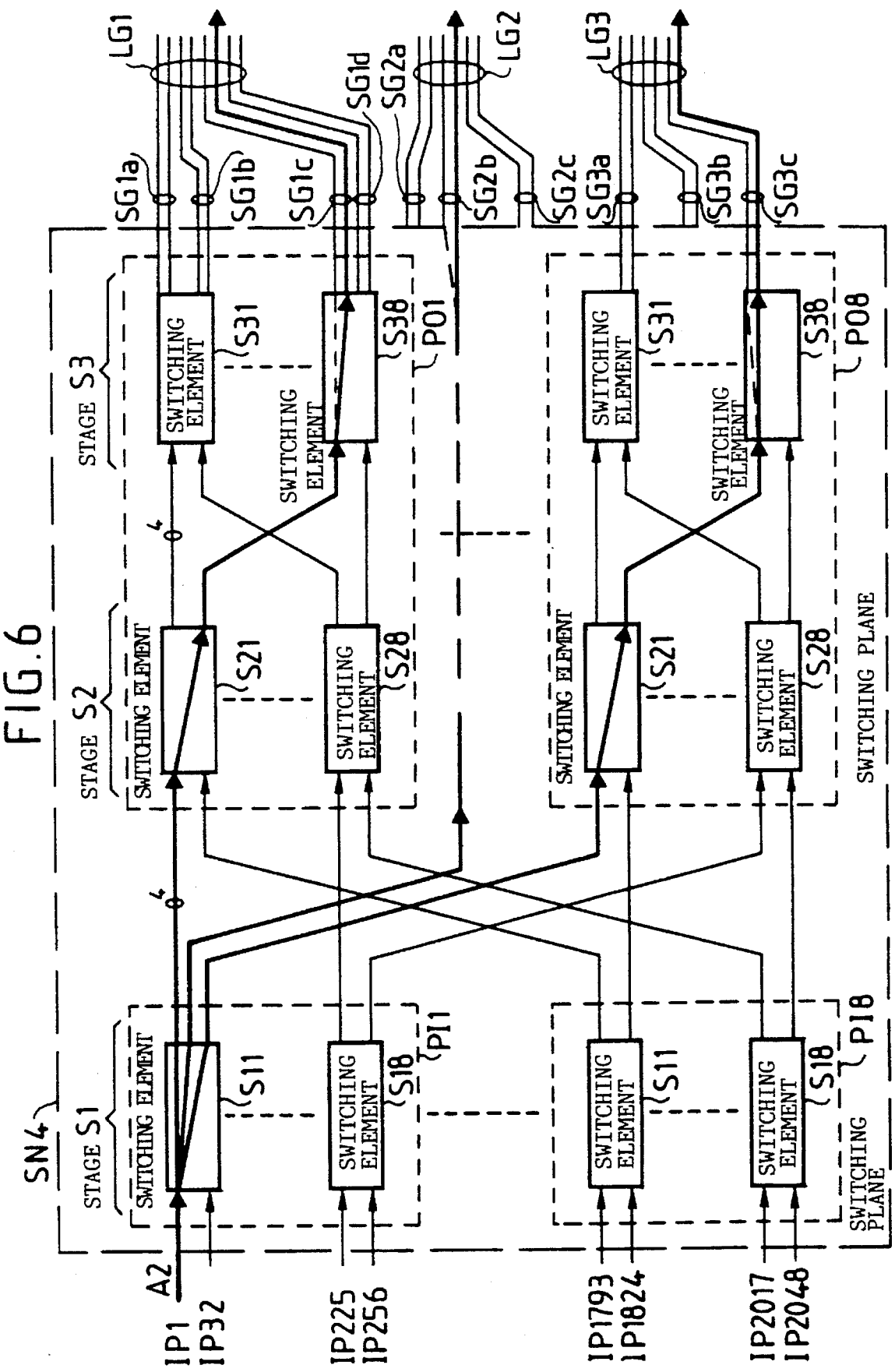

FIGS. 5 and 6 show the same block diagram as FIG. 1 but with the switching elements all capable of carrying out routing with broadcasting. FIGS. 5 and 6 illustrate broadcasting of a cell to three destinations in the form of three groups of outputs LG1, LG2, LG3. In each of these figures the broadcast tree is shown in bold line.

In the FIG. 5 embodiment a cell is supplied to the input LP1 with an internal routing label comprising the identifier A1 of a broadcast tree for routing a first copy of this cell to a regular subgroup SG1a of the irregular group of outputs LG1, a second copy of this cell to the regular subgroup SG2c of the irregular group SG2, and a third copy of this cell to a regular subgroup SG2b of the irregular group LG3. Three copies of the cell are created in the switching element S11 of the plane PI1 of the first switching stage S1. These three copies are sent through outputs of the switching element S11 providing access to the subgroups SG1a, SG2c and SG3b, respectively.

The first copy is routed via the switching elements S21 and S31 of the plane P01. The switching element S31 performs distribution within the subgroup SG1a. It therefore chooses at random one output from the outputs of the subgroup SG1a and forwards the first copy to this output. The other possible selections by the switching element S31 are shown in dashed line in the figure. An output is selected within the subgroup SG2c and an output is selected within the subgroup SG3b in an analogous manner by switching elements that are not shown in the figure.

FIG. 6 illustrates the operation of the same node when a cell is applied to the same input I1 with an internal routing label comprising the identifier A2 of a different broadcast tree for routing three copies of this cell to a regular subgroup SG1c of the irregular group LG1, a regular subgroup SG2b of the irregular group LG2 and a regular subgroup SG3c of the irregular group LG3, respectively. In this embodiment the three copies of the cell are again created in the switching element S11 of the plane PI1, but they take different paths compared to the previous embodiment. The first copy is sent to an output of the regular subgroup SG1c which is chosen at random by the switch S38 of the plane P01. The second copy is sent to one output of the regular subgroup SG2b by a switching element that is not shown. The third copy is sent to an output chosen at random by the switching element S38 of the plane P08 from the outputs of the regular subgroup SG3c.

The number of predetermined broadcast trees A1, A2, etc for broadcasting a cell from the input IP1 to the three groups LG1, LG2, LG3 is equal to the number of combinations of three subgroups that can be obtained by taking one subgroup from each of the groups LG1, LG2, LG3. For each input and for each combination of destinations there is a set of broadcast trees which are predetermined by the architecture of the switching network SN4 employed.

A switching network with the capability for multipath self-routing with group routing and broadcasting is described in European patent application EP-A-91-101915.5, for example.

Figure 7:
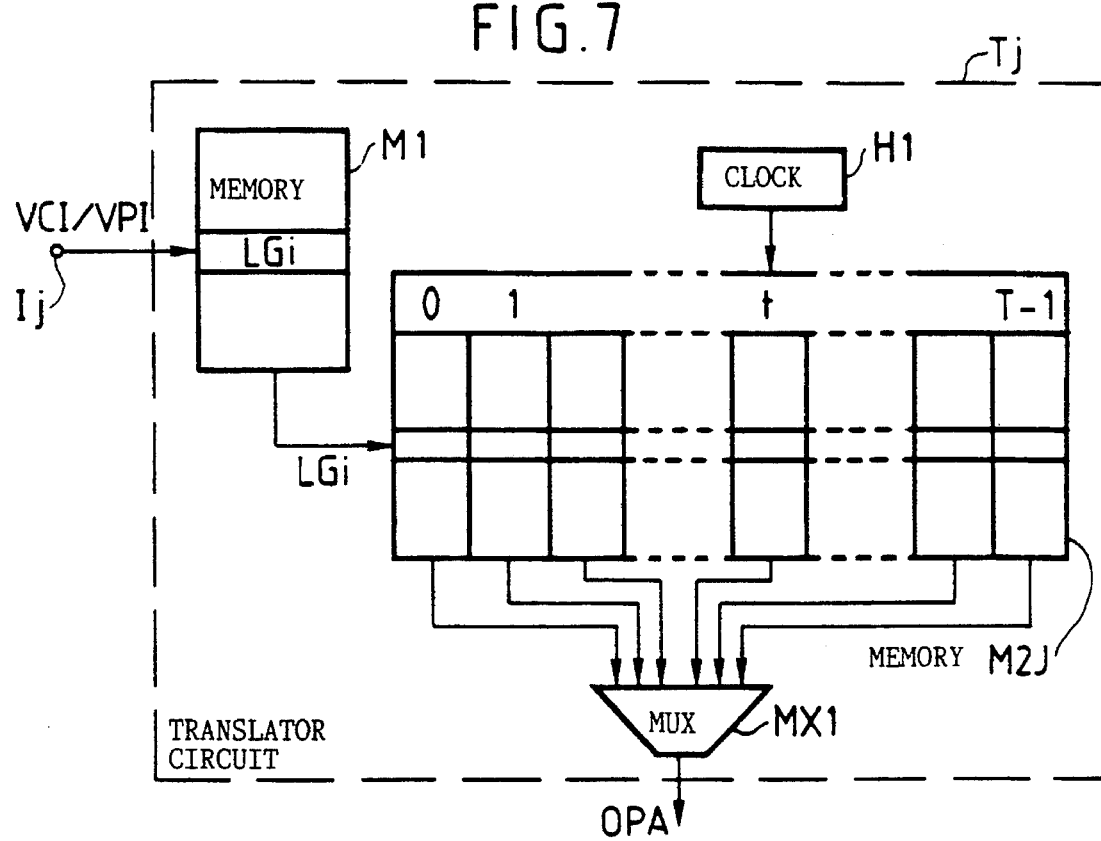
FIGS. 7 and 8 respectively represent block diagrams of two translator circuits for selecting an internal routing label on the basis of virtual circuit and virtual circuit group identifiers.
Figure 8:
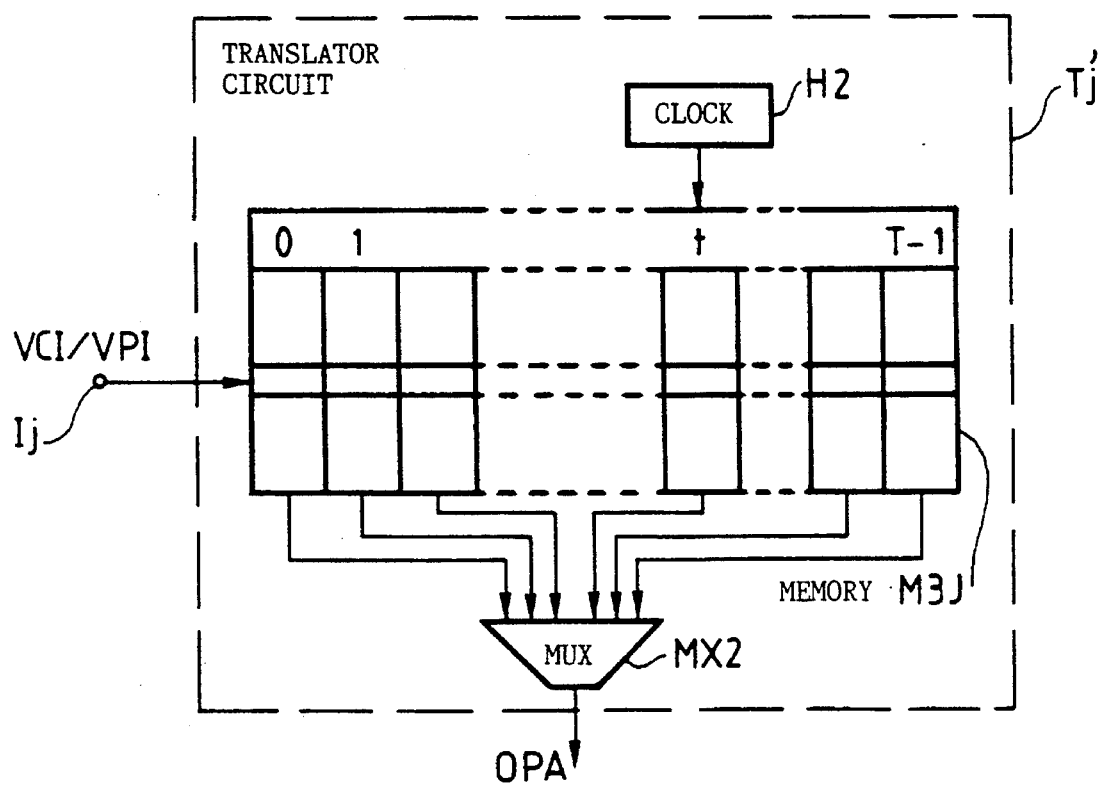

FIGS. 7 and 8 show two respective embodiments of translator circuits Tj and Tj' for determining an internal routing label. These include tables stored in memories, but it is equally possible to determine a value by means of a computation carried out for each cell received by the switching network. Moreover, these two embodiments are more particularly concerned with the situation in which:

the internal routing label associated with a cell is selected from labels which identify a regular subgroup comprising a single output, so that these labels are therefore the address of an output, the cell has a single destination, and all the outputs have the same bandwidth.

The device Tj shown in FIG. 7 operates in two stages:

to determine an identifier LGi of a group of outputs on the basis of identifiers VCI-VPI, by reading the value LGi at the address VCI-VPI in a memory M1, which is identical for all the translator circuits T1, ..., TN;

to read the address OPA of an output of a group LGi, in a memory M2j corresponding to the input Ij of the node.

The memory M2j is addressed by the value Ij and by a value t supplied by a clock H1. The clock H1 supplies a series of values at a rate corresponding to that at which cells are received at each input I1, ..., IN and with modulo T equal to 128 times the duration of a cell, for example. The memory M2j includes T columns corresponding to the values t=0 to t=1. Each column includes as many rows as there are groups of outputs LG1, ..., LGk. A multiplexer MX1 collects the value OPA supplied by all the columns. This value OPA constitutes the internal routing label OPA which is supplied to the input IPj of the network SN at the same time as the cell in question.

FIG. 8 shows a second embodiment TJ' of translator device for determining an internal routing label without explicit determination of the address LGi of the group of outputs to which the cell in question is addressed. It no longer includes memories M1 for determining the address LGi, but it does include a memory M3j addressed simultaneously by the value of the identifiers VCI-VPI and by the value t supplied by a clock H2 similar to the clock H1 described previously. The memory M3j includes T columns corresponding to the values t=0 to t=t−1. Each column includes as many rows as there are values VCI-VPI usable for the groups LG1, . . . , LGk. A multiplexer MX2 collects the value OPA supplied by all the columns of the memory M3j. This value OPj constitutes the value of the internal routing label OPA which is supplied to the input IPj of the switching network SN.

Consider now algorithms usable to choose the output addresses OPA in such a way as to effect temporal decorrelation and spatial decorrelation.

The table below represents the content of the various memories M21, . . . , M2N or M31, . . . , M3N, limited to a single row corresponding to a given group which includes only three outputs: L1, L2, L3; the modulo T of the clock is equal to 128 times the duration of a cell and the number N of inputs of the switching network SN is equal to 16.

TABLE N° 1

| t= | 0 | 1 | 2 | 3 | 4 | 5 | 6 | ... | 125 | 126 | 127 |
|---|---|---|---|---|---|---|---|---|---|---|---|
| j=1 | L1 | L2 | L3 | L1 | L2 | L3 | L1 | ... | L3 | L1 | L2 |
| 2 | L2 | L3 | L1 | L2 | L3 | L1 | L2 | ... | L1 | L2 | L3 |
| 3 | L3 | L1 | L2 | L3 | L1 | L2 | L3 | ... | L3 | L1 | L2 |
| 4 | L1 | L2 | L3 | L1 | L2 | L3 | L1 | ... | L1 | L2 | L3 |
| . | . | . | . | . | . | . | . | | . | . | . |
| . | . | . | . | . | . | . | . | | . | . | . |
| 16 | L1 | L2 | L3 | L1 | L2 | L3 | L1 | ... | L3 | L1 | L2 |

In this example, the number of outputs (3) being less than the number of inputs (16), more than one input is associated with the same output at any given time. For example, at time t=5, cells arriving at the input of rank j=1, at the input of rank j=4 and at the input of rank J=16 are routed to the same output L3. Moreover, as the number of outputs in the group LGi is not a submultiple of 128, the outputs do not all appear in this table the same number of times. In other words, the distribution of the cells between the three outputs is not absolutely regular. However, the differences are minimal since each output appears, at worst, only one time more than the other outputs in the whole of the table.

In this selection algorithm the identifiers of the outputs L1, L2, L3 are distributed as regularly as possible in the table by incrementing the index i of the output Li by one time unit for each increment, filling the row successively. As the modulo T is not a multiple of the number of outputs constituting the group (this number is 3), there is an offset of the number of identifiers for each increment of one unit of the rank j of the input Ij which received the cell in question. This offset as a function of the time at which a cell is received and as a function of the rank of the input which received the cell is sufficient to achieve temporal decorrelation and spatial decorrelation of the cell.

The table below represents the content of a single row of the memories M21, . . . , M2N or M31, . . . , M3N, limited to a given group including 259 outputs L1, . . . , L259. The modulo T of the clock is equal to 128 times the duration of a cell.

TABLE N° 2

| t | 0 | 1 | 2 | 3 | 4 | 5 | 6 | ... | 125 | 126 | 127 |
|---|---|---|---|---|---|---|---|---|---|---|---|
| J=1 | L1 | L2 | L3 | L4 | L5 | L6 | L7 | ... | L125 | L127 | L128 |
| 2 | L129 | L130 | L131 | L132 | L133 | L134 | L135 | ... | L254 | L255 | L256 |
| 3 | L257 | L258 | L259 | L1 | L2 | L3 | L4 | ... | L123 | L124 | L125 |
| 4 | L127 | L128 | L129 | L130 | L131 | L132 | L133 | ... | 251 | L252 | L253 |
| . | . | . | . | . | . | . | . | | . | . | . |
| . | . | . | . | . | . | . | . | | . | . | . |
| 16 | L107 | L108 | L109 | L110 | L111 | L112 | L113 | ... | L233 | L234 | L235 |

In this selection algorithm the identifiers of the outputs are distributed regularly over the successive rows for j=1 to 16 by incrementing the index i of the output Li by one unit for each additional time unit modulo 259 which is the number of outputs constituting the group. As the number of outputs is not a multiple of T, the outputs corresponding to j=1 to 16 for a fixed value of t are different from each other. Spatial decorrelation and temporal decorrelation are thereby achieved.

The number of outputs that the group includes is greater than the number of time units counted by the clock, and consequently during T clock periods some outputs of the group are never used for cells arriving at an input having a given rank j. For example, the outputs L129, L130, L259 are never used to output cells received at the input of rank j=1. On the other hand, these outputs are used to output cells received by the input of rank j=2 and cells received by the input of rank j=3.

Another algorithm for selecting the identifiers of the outputs of the group L1, . . . , L259 entails distributing them regularly column by column for t=0 through t=127, incrementing the index i of the output Li by one unit on incrementing by one unit the rank j of the input modulo the number N=16 of inputs. The table below gives the content of the rows of the memories M21, . . . , M2N corresponding to the groups L1, . . . , L259 when this algorithm is used.

TABLE N° 3

| t | 0 | 1 | 2 | 3 | ... | 15 | 16 | ... | 125 | 126 | 127 |
|---|---|---|---|---|---|---|---|---|---|---|---|
| J=1 | L1 | L17 | L33 | L49 | ... | L241 | L257 | ... | L188 | L204 | L220 |

TABLE N° 3-continued

| t  | 0   | 1   | 2   | 3   | ... | 15   | 16   | ... | 125  | 126  | 127  |
|----|-----|-----|-----|-----|-----|------|------|-----|------|------|------|
| 2  | L2  | L18 | L34 | L50 | ... | L242 | L258 | ... | L189 | L205 | L221 |
| 3  | L3  | L19 | L35 | L51 | ... | L243 | L259 | ... | L190 | L206 | L222 |
| 4  | L4  | L20 | L36 | L52 | ... | L244 | L1   | ... | L191 | L207 | L223 |
| .  | .   | .   | .   | .   |     | .    | .    |     | .    | .    | .    |
| 16 | L16 | L32 | L48 | L64 | ... | L256 | L14  | ... | L203 | L219 | L235 |

The output selection algorithms described above increment the output address by one unit for each time unit elapsed and for each unit of rank of the input in question. In an alternative embodiment the time variable t can be replaced by any random number changing dynamically by ensuring that the various values of this random number have the same statistical probability.

Consider the situation in which the internal routing label is selected from predetermined labels some of which identify a regular subgroup including a plurality of outputs having consecutive or non-consecutive addresses. The translator devices shown in FIGS. 7 and 8 are identical, only the meaning of the content of the memories M2$j$ and M3$j$ changing. The address of a single output OPA is replaced by an address common to a plurality of outputs. This address is denoted OPCA if these outputs have consecutive addresses or OPSGA if the addresses are related by some other mathematical relationship. If the switching network enables broadcasting, a broadcast tree identifier can be stored instead of an output address OPA.

If the output subgroups do not have the same bandwidth, weighting must be applied when selecting them. This weighting can consist in storing in memory a list of output addresses or subgroup addresses or tree identifiers with some duplicated several times to increase their chances of being selected. Those with the minimal bandwidth appear once only in the list. Those whose bandwidth is equal to twice the minimal bandwidth each appear twice in the list, and so on.

There is claimed:

1. An asynchronous switching node distributing cells dynamically to outputs constituting an irregular group, the addresses of the outputs of the irregular group not being mathematically related, said node including:

an input stage receiving cells on a plurality of inputs and receiving for each cell external routing information, said input stage adding to each cell an internal routing label conditioned by said external routing data, the label added to a cell addressed to an irregular group of outputs being selected from predetermined internal routing labels respectively identifying regular subgroups of the outputs of said node, a combination of which constitutes said irregular group, each regular subgroup including a single output or a plurality of outputs whose addresses are mathematically related; and a plurality of switching stages connected to said input stage, each switching stage including at least one switching element which includes means for transferring a cell received at one of its inputs to at least one of its outputs according to said internal routing label associated with said cell.

2. The node according to claim 1, comprising label selecting means which select a label using an algorithm which selects different labels for cells which are respectively received by different inputs of the input stage.

3. The node according to claim 2, wherein said algorithm selects different labels for cells which are received by a same input of the input stage respectively at different times.

4. The node according to claim 3, wherein said algorithm is dependent on a variable consisting of the sum of a variable representing the identity of the input receiving a cell, and of a variable representing time, incremented by time units equal to the duration of a cell.

5. The node according to claim 2, wherein said algorithm is further dependent on the bandwidth of each regular subgroup constituting the irregular group to which a cell is addressed.

6. The node according to claim 1, wherein said switching stages comprise at least one stage having a single-path routing capability, and wherein each predetermined routing label identifies only one output of said stage.

7. The node according to claim 1, wherein said switching stages comprise stages having a single-path routing capability, and further including, on the downstream side thereof, an additional stage having the capability to distribute cells at random in a regular group of outputs of said node that are called a cluster, each cluster being made up of outputs whose addresses have consecutive values, in which node at least one of said predetermined internal routing labels identifies a cluster of outputs of said node.

8. The node according to claim 1, wherein at least one of said switching stages comprises at least one switching element with a multipath routing capability, said node further including:

means for identifying a group of outputs, called a routing group, among the outputs of said element with a multipath routing, said outputs providing access to one output of a regular subgroup identified by an internal routing label; and means for selecting an output from the group of outputs identified by said means for identifying;

wherein at least one of said predetermined routing labels identifies a regular subgroup including a plurality of outputs.

9. The node according to claim 1, for broadcasting a plurality of copies of a cell to a respective plurality of destinations each of which can be an irregular group, wherein at least one of said switching stages comprises at least one switching element with the capability to broadcast a copy of said cell according to a predetermined broadcast tree, said element including:

means for identifying a plurality of groups of outputs of said element having the capability to broadcast, called routing groups, according to a broadcast tree number included in said internal routing label of said cell;

means for searching at least one output at random from the outputs of each routing group so identified in said element having the capability to broadcast; and means for sending a copy of said cell to each of the outputs so identified;

wherein at least one of said predetermined routing labels identifies a broadcast tree enabling said copy of a cell to be routed to a regular subgroup of each of said irregular groups constituting the destinations of said cell.

* * * * *